United States Patent [19]

Marincic et al.

[11] 4,303,744
[45] Dec. 1, 1981

[54] METHOD FOR REDUCING GAS PRESSURE IN AN ELECTROCHEMICAL CELL

[75] Inventors: Nikola Marincic, Winchester; Robert C. McDonald, Stow, both of Mass.

[73] Assignee: GTE Products Corporation, Stamford, Conn.

[21] Appl. No.: 207,494

[22] Filed: Nov. 17, 1980

[51] Int. Cl.³ .......................................... H01M 10/52
[52] U.S. Cl. .......................................... 429/52; 429/49
[58] Field of Search ................... 429/52, 50, 53, 57, 429/71, 72, 48, 49, 194

[56] References Cited

U.S. PATENT DOCUMENTS 3,483,042  12/1969  Hulse .................................... 429/52
3,721,586  3/1973  Jasinski et al. ................... 429/52 X
4,184,010  1/1980  Dey et al. ......................... 429/53 X

*Primary Examiner*—Anthony Skapars
*Attorney, Agent, or Firm*—Peter Xiarhos

[57] ABSTRACT

A method for treating carbon-containing cathodes of a primary electrochemical cell for the purpose of reducing the gas pressure in the cell during open circuit and during discharge of the cell. The method of the invention includes purging the carbon-containing cathodes of the cell with sulfur dioxide or thionyl chloride gas to displace water and insoluble gases (oxygen and nitrogen, and argon or helium) entrapped within the carbon of the carbon-containing cathodes. The purge gas is soluble in an electrolytic solution including liquid thionyl chloride as is employed to activate the cell for use in discharge.

18 Claims, 2 Drawing Figures

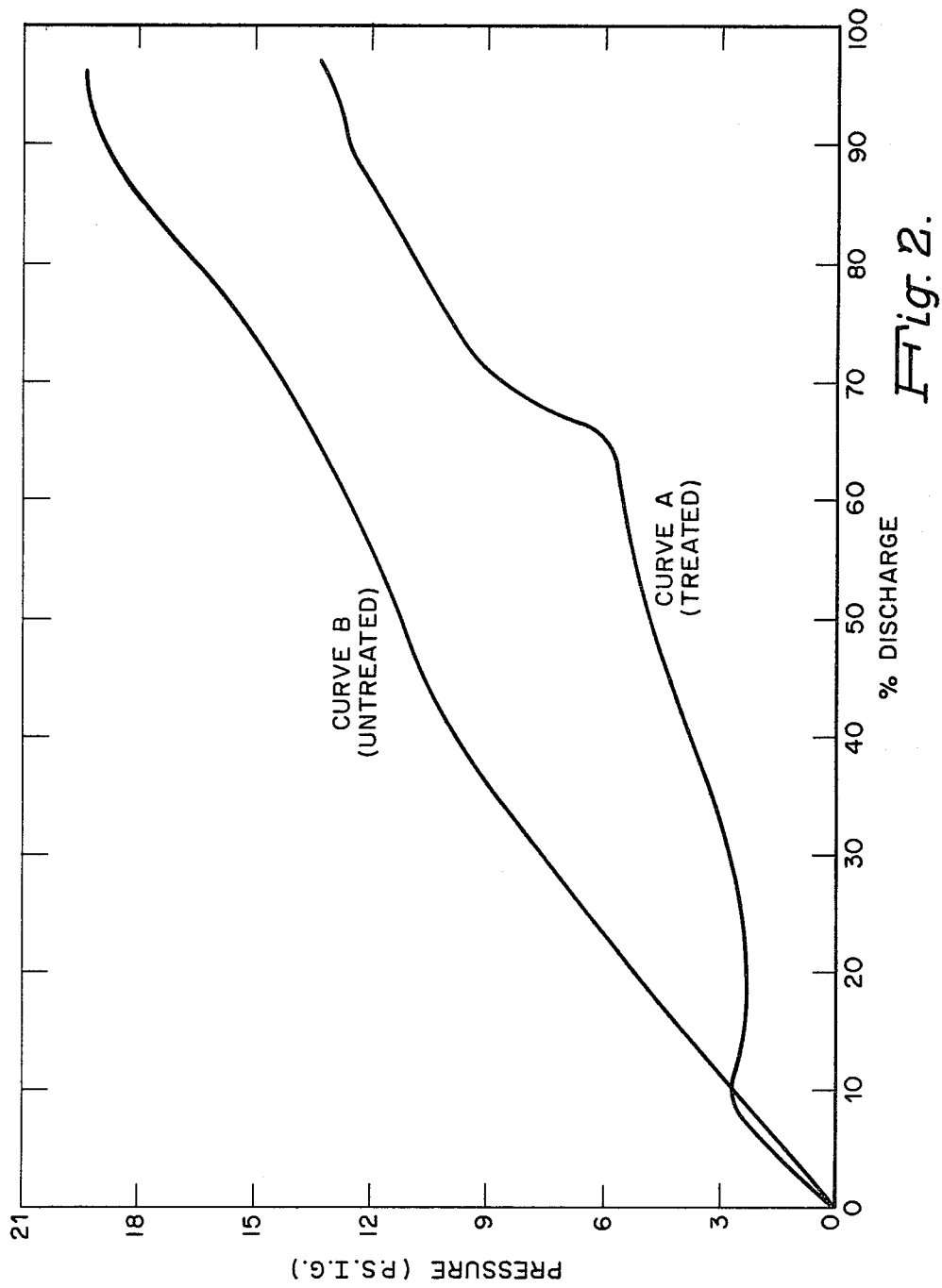

METHOD FOR REDUCING GAS PRESSURE IN AN ELECTROCHEMICAL CELL

The invention herein described was made in the course of a contract with the Department of the Air Force.

BACKGROUND OF THE INVENTION

The present invention relates to a method for reducing gas pressure in an electrochemical cell and, more particularly, to a method for treating carbon cathodes of a primary electrochemical cell in order to reduce the gas pressure in the cell during open circuit and during discharge of the cell.

Primary electrochemical cells are generally well known and understood by those skilled in the art. One particularly useful primary electrochemical cell, especially for high current drain applications, is a so-called prismatic primary electrochemical cell. Such cell is generally described in U.S. Pat. No. 4,086,397, in the names of Franz Goebel and Nikola Marincic, and includes a physically large battery stack enclosed together with an electrolytic solution within a large, generally rectangular, metal (e.g., stainless steel) housing. The battery stack as used within the cell comprises a large number of generally rectangular cell components including a plurality of anodes, carbon cathodes, and insulative separators (e.g., of glass fiber) between the anodes and the carbon cathodes. Each anode generally comprises a large rectangular sheet of an oxidizable alkali metal, such as lithium, physically impressed into a supporting metal (e.g., nickel) grid, and each carbon cathode comprises a metal (e.g., nickel) current collector grid and an aggregation of porous, semi-rigid carbon globules or conglomerates physically impressed into the grid. A common and preferred electrolytic solution employed in the cell as described above is an electrolyte solution comprising a reducible soluble cathode material such as thionyl chloride and an electrolyte solute such as lithium tetrachloroaluminate dissolved in the thionyl chloride.

By the appropriate selection of the battery cell components and materials, a cell as described above can be constructed to have any one of several possible sizes and characteristics. A typical cell, for example, has exterior dimensions of approximately 18 inches $\times$ 13 inches $\times$ 10 inches, a weight of 156 pounds, a capacity rating of 10,000 ampere-hours, and a nominal discharge current of 40 amperes.

During open circuit or during discharge of a primary electrochemical cell having the above-described characteristics, various gases are present in the cell, either initially or generated subsequent to closing (i.e., sealing) of the cell. The quantity of these gases generally increases with time, leading to an increase in gas pressure within the cell. For reasons of structural integrity of the cell and minimizing damage thereto, it is ordinarily desirable to minimize the gas pressure within the cell. The gases present within the cell during the cell lifetime (open circuit and discharge period) include thionyl chloride vapors and small amounts of insoluble gases such as oxygen, nitrogen, argon or helium present in the cell from the start, and gases generated during the cell lifetime, such as hydrogen and sulfur dioxide. The oxygen and nitrogen gases are present in the cell throughout the manufacture of the cell. The inert argon or helium gas is employed to displace air in the cell before it is activated by the addition of the electrolytic solution, at which time the cell is evacuated to remove as much of the gases as possible, leaving only small amounts of the gases in the cell. The hydrogen generated in the cell during discharge is due to the presence of trace amounts of water in the cell which react with the electrolytic solution to produce a variety of protic (proton-containing) hydrolysis products which, in turn, react with lithium metal to produce hydrogen gas.

The water in the cell which leads to the generation of hydrogen gas as discussed above is normally present within the carbon cathodes as a result of an affinity of the water for, and absorption by, these electrodes. Obvious solutions for reducing or minimizing the amount of water absorbed by the carbon cathodes, such as heat and vacuum treatments of the carbon cathodes, are of limited value because of the extremely low vapor pressure of absorbed water. The preparation of extremely dry carbon cathodes is therefore very difficult.

BRIEF SUMMARY OF THE INVENTION

A method is provided in accordance with the present invention for reducing the internal gas pressure in an electrochemical cell. The method of the invention generally is employed for the removal of water in the cell. The method includes an initial step of providing an electrochemical cell including a plurality of electrodes but lacking an electrolytic solution. The electrodes include a carbon-containing electrode in which water is absorbed in the carbon of the electrode. Following the above step, the electrochemical cell is evacuated and then purged with a purge fluid. This purge fluid, which may take the form of a gas, is selected to be soluble in the electrolytic solution to be used in the cell and operates to displace water absorbed in the carbon of the carbon-containing electrode.

The above method may also be used to displace one or more insoluble gases entrapped, together with water, within the carbon of the carbon-containing electrode. In this case, both the water and the gas(es) are replaced by the purge fluid during the purging operation.

BRIEF DESCRIPTION OF THE DRAWING

FIG. 2 illustrates curves of gas pressure within primary electrochemical cells during discharge thereof and illustrating a reduction in gas pressure during discharge as achieved by employing evacuation and purge operations in accordance with the method of the present invention.

DETAILED DESCRIPTION OF THE INVENTION

Figure 1:
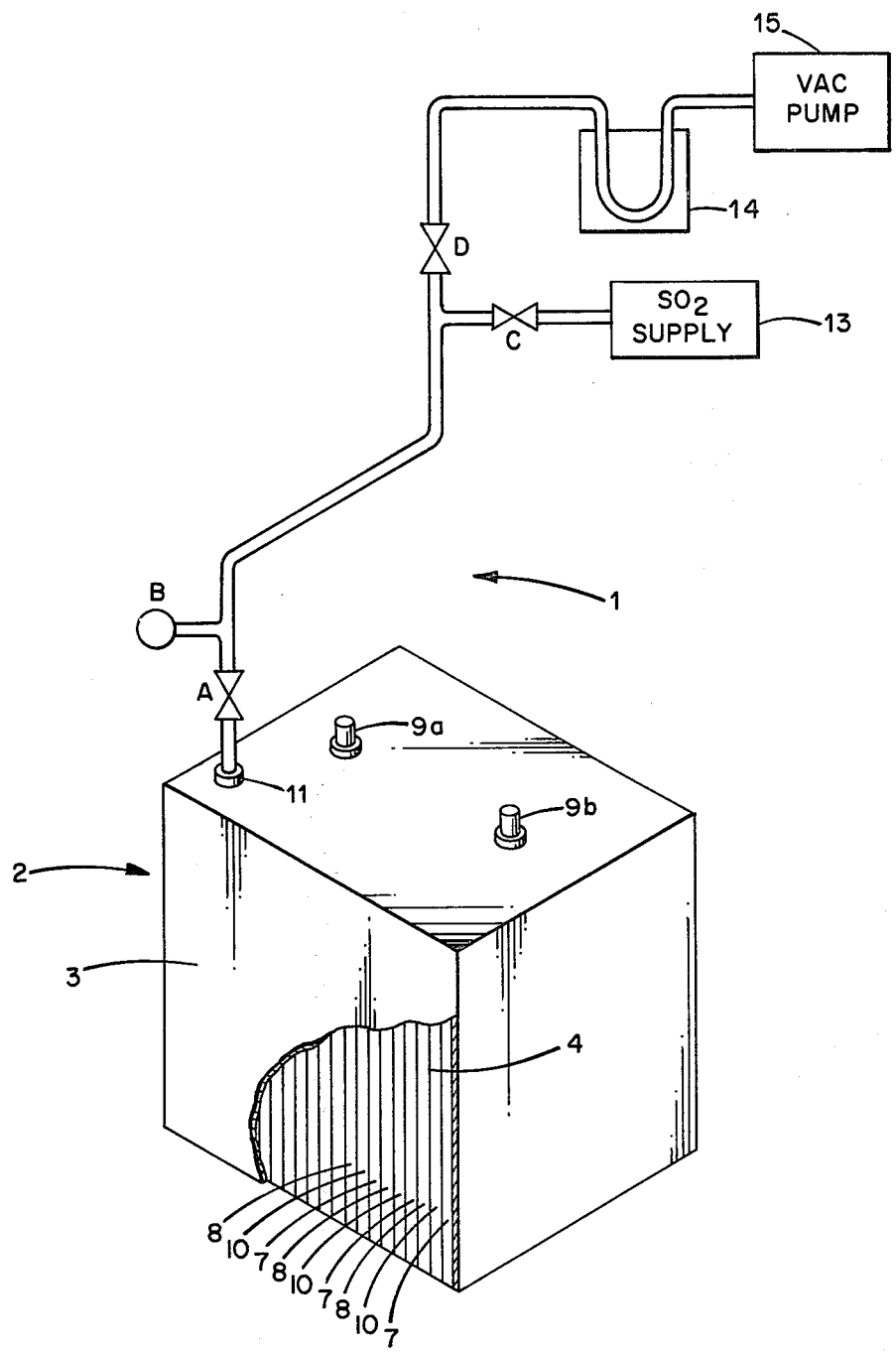
FIG. 1 of the drawing illustrates an evacuation/purge arrangement as used in conjunction with a primary electrochemical cell in accordance with the method of the present invention for the purpose of reducing gas pressure within the cell during the lifetime of the cell.

Referring now to FIG. 1, there is shown an evacuation purge arrangement 1 as employed in conjunction with a primary electrochemical cell 2 in accordance with the method of the present invention for reducing the gas pressure within the cell 2 during the lifetime (open circuit and subsequent discharge) of the cell 2. The cell 2 as shown in FIG. 1 lacks an electrolytic solution which is normally employed to activate the cell. The primary electrochemical cell 2 is of a so-called prismatic type and, as shown in the drawing, generally includes a rectangular housing 3 within which a battery stack 4 is disposed. The housing 3 may be of stainless steel and have typical outer dimensions of approximately 18 inches (height)×13 inches (width)×10 inches (depth). The battery stack 4 as employed within the housing 3 comprises a large number of generally rectangular cell components. These components include a plurality of anodes 7, carbon cathodes 8 and insulative separators 10 between the anodes 7 and the carbon cathodes 8. Although not specifically shown in the drawing, in a preferred form and construction of the battery stack 4, each of the anodes 7 comprises a large rectangular sheet of an oxidizable alkali metal, such as lithium, pressed into a supporting metal (e.g., nickel) grid, and each of the carbon cathodes 8 comprises an aggregation of porous semi-rigid carbon globules or conglomerates pressed into a metal (e.g., nickel) grid to be supported thereby. The grids of the electrodes 8 collectively serve as current collector members for the cell during discharge of the cell 2. The separators 10, which serve to electrically isolate the anodes 7 from the carbon cathodes 8, may be of a suitable insulative material such as glass fibers.

Although not shown in the drawing, the plurality of anodes 7 and the plurality of carbon cathodes 8 are coupled by way of associated terminal connection assemblies to corresponding electrical terminals 9a and 9b which, in turn, are coupled to an apparatus which is to be powered by the cell 2. The cell 2 further includes a port 11 to which the aforementioned evacuation/purge arrangement 1 is connected. As will be described in detail hereinafter, the port 11 is used by the evacuation/purge arrangement 1 for performing certain evacuation and purge operations following which the port 11 is used for introducing an electrolytic solution into the cell to activate the cell 2. The port 11 is also used for introducing an insoluble inert gas, such as argon or helium, into the cell for displacing air in the cell until the cell is to be activated by the addition of the electrolytic solution at which time the cell is evacuated to remove as much of the gas as possible, as well as oxygen and nitrogen gases remaining in the cell as a result of the manufacture of the cell. A suitable electrolytic solution which is compatible with the cell components as described hereinabove is an electrolyte solution comprising a reducible soluble cathode material such as thionyl chloride and an electrolyte solute such as tetrachloroaluminate dissolved in the thionyl chloride.

In the cell 2 as described hereinabove, it is very important that the presence of water be minimized to the greatest degree possible. Water within the cell 2 has a great affinity for, and is absorbed by, the porous carbon globules or conglomerates of the carbon cathodes 8. These electrodes depend for their effectiveness on high surface area and high surface catalytic activity of finely divided carbon. The absorption of water at the large surface areas of these electrodes can result in the generation of substantial amounts of gases in the cell during discharge of the cell, leading to an increase in the gas pressure within the cell and a possible impairment of the structural integrity of the cell. As previously described, in the event water is present within the cell during discharge, this water reacts with the electrolytic solution in the cell to produce protic hydrolysis products which, in turn, react with lithium metal in the cell to produce hydrogen gas. This hydrogen gas, together with sulfur dioxide gas produced during the discharge of the cell (and which increases volumetrically slightly during the discharge of the cell), results in an increased gas pressure within the cell.

In accordance with the present invention, the cell 2 as described hereinabove is treated, specifically, by means of the evacuation/purge arrangement 1, to minimize and substantially reduce the amount of water and gases in the cell prior to the activation of the cell by the introduction of electrolytic solution into the cell. In particular, the carbon cathodes 8 of the cell 2 are treated by at least one cycle of an evacuation/sulfur dioxide purge/evacuation of the cell 2 by which trace amounts of water absorbed by the carbon of the electrodes 8, as well as small amounts of gases trapped by the electrodes 8, are largely expelled from the cell 2. Additional cycles of sulfur dioxide purges and evacuations, for example, up to a total of three cycles, may provide additional removal of water and trapped gases provided each evacuation is complete (that is zero psia). (This complete evacuation requires an outer vacuum chamber for preventing collapse of the housing of the cell).

The evacuation/purge arrangement 1 for treating the carbon cathode electrodes 8 of the cell 2 as discussed hereinabove includes a valve A and an associated gauge B coupled to the port 11. The valve A is coupled by way of a valve C to a supply 13 of sulfur dioxide gas ($SO_2$) and by way of a valve D and a liquid nitrogen trap 14 to a vacuum pump 15. All of the above-mentioned valves prior to an evacuation/purge/evacuation sequence are in their closed positions.

To perform an evacuation/purge/evacuation sequence in accordance with a typical procedure, the liquid nitrogen trap 14 is operated to solidify the sulfur dioxide gas from the supply 13 (to protect the vacuum pump 15 from $SO_2$ vapors), and the vacuum pump 15 is turned on. The valve D is then opened and the pump 15 adjusted to read 5 psia at the gauge B. The valve A is then opened and the vacuum adjusted, if necessary, to maintain 5 psia at the gauge B. The vacuum is maintained for 15 minutes, during which time the gases in the cell are largely removed from the cell, leaving only trace amounts entrapped within the carbon electrodes 8. Valves A and D are then closed, and the vacuum pump 15 is turned off. Valve C is then opened, and the regulator of the $SO_2$ supply is adjusted to 20 psia. Valve A is then opened and the $SO_2$ regulator is re-adjusted to read a constant pressure of 20 psia at the gauge B. The $SO_2$ pressure is maintained for 15 minutes. During this 15 minute period, the sulfur dioxide gas entering the cell 2 comes in contact with the porous carbon globules of the cathode electrodes 8. The sulfur dioxide gas has a great affinity for carbon and serves to displace water absorbed by the carbon globules and also gases trapped within the carbon globules. At the conclusion of the 15-minute $SO_2$ purge, the cell 2 is again evacuated in the same manner as described above to remove as much of the sulfur dioxide gas as possible as well as the water and gases displaced by the sulfur dioxide gas. Following the above-described evacuation/purge/evacuation sequence, and as mentioned previously, additional cycles or sequences of purge/evacuation operations may be used for further increasing the removal of water and trapped gases. At the conclusion of the last cycle, whether a single cycle or the last of multiple cycles, the cell is then in a condition, after disconnection of the arrangement 1, to receive an electrolytic solution by way of the port 11. For an electrolytic solution including liquid thionyl chloride, the use of sulfur dioxide for purging purposes is especially desirable since sulfur dioxide gas is soluble in liquid thionyl chloride and compatible with lithium metal and does not, in and of itself, add significantly to the internal gas pressure of the cell. Thionyl chloride vapors may also be used as a purge gas in lieu of sulfur dioxide gas.

The effect of the above-described evacuation/purge/evacuation operations on reducing gas pressure within a cell is best illustrated by FIG. 2. FIG. 2 illustrates a first curve A of gas pressure (in psig) versus percent (%) discharge for an electrochemical cell in which the carbon cathodes have been treated by a single evacuation/$SO_2$purge/evacuation cycle, and a second curve B of gas pressure versus percent (%) discharge for an electrochemical cell in which the carbon cathodes have not been subjected to an evacuation/$SO_2$purge/evacuation cycle. The two cells to which the curves A and B pertain are of the same design and construction with the cells having the same number of pairs of anodes and cathodes and separators intermediate to these pairs of electrodes. As indicated in FIG. 2, for up to the 10 percent discharge level, the cell having the untreated carbon cathodes (curve B) has a lower internal gas pressure than the cell having the treated (purged) carbon cathodes (curve A). However, beyond the 10 percent discharge level, and until the cells have been essentially completely discharged, the cell having the treated carbon cathodes (curve A) has a lower internal pressure than the cell having the untreated (curve B) carbon cathodes. In a typical test situation, the reduction in gas pressure is about 20 percent, principally due to a reduction of hydrogen gas resulting from the lithium reduction of water as described hereinabove.

Although the method of the invention has been described hereinabove in connection with a large prismatic cell, it is to be understood and appreciated that the steps of the method can also be applied to cells of other configurations and sizes, for example, A and D size cylindrical cells and button cells as are commonly known and understood by those skilled in the art.

While there has been described what is considered to be a preferred method of the invention, it will be apparent to those skilled in the art that various changes and modifications may be made therein without departing from the invention as called for in the appended claims.

We claim:

1. A method comprising the steps of:
providing an electrochemical cell including a plurality of electrodes but lacking an electrolytic solution, said electrodes including a carbon-containing electrode in which water is absorbed in the carbon of said carbon-containing electrode;
evacuating the electrochemical cell; and
purging the cell with a purge fluid soluble in the electrolytic solution to be used in the cell and operable to displace water absorbed in the carbon of the carbon-containing electrode.

2. A method in accordance with claim 1 further comprising the additional steps of:
evacuating the cell after the purging step; and
introducing into the cell an electrolytic solution in which the purge fluid is soluble.

3. A method in accordance with claim 1 wherein:
the step of purging the cell comprises the step of purging the cell with a purge gas soluble in an electrolytic solution including liquid thionyl chloride.

4. A method in accordance with claim 3 wherein:
the purge gas is selected from the group consisting of sulfur dioxide and thionyl chloride.

5. A method in accordance with claim 4 wherein:
the carbon of the carbon-containing electrode comprises an aggregation of porous, semi-rigid carbon globules.

6. A method in accordance with claim 1 further comprising:
additional cycles of purging and evacuating steps.

7. A method in accordance with claim 6 further comprising the step of:
introducing into the cell following the last cycle of purging and evacuating steps an electrolytic solution in which the purge fluid is soluble.

8. A method in accordance with claim 6 wherein:
the steps of purging the cell comprise the steps of purging the cell with a purge gas soluble in an electrolytic solution including liquid thionyl chloride.

9. A method in accordance with claim 8 wherein:
the carbon of the carbon-containing electrode comprises an aggregation of porous, semi-rigid carbon globules.

10. A method comprising the steps of:
providing an electrochemical cell including a plurality of electrodes but lacking an electrolytic solution, said electrodes including a carbon-containing cathode in which water and an insoluble gas are entrapped in the carbon of said cathode;
evacuating the electrochemical cell; and
purging the cell with a purge fluid soluble in the electrolytic solution to be used in the cell and operable to displace water and insoluble gas entrapped in the carbon of the carbon-containing electrode.

11. A method in accordance with claim 10 further comprising the steps of:
evacuating the cell after the purging step; and
introducing into the cell an electrolytic solution in which the purge fluid is soluble.

12. A method in accordance with claim 11 wherein:
the step of purging the cell comprises the step of purging the cell with a purge gas soluble in an electrolytic solution including liquid thionyl chloride.

13. A method in accordance with claim 12 wherein:
the purge gas is selected from the group consisting of sulfur dioxide and thionyl chloride.

14. A method in accordance with claim 13 wherein:
the carbon of the carbon-containing electrode comprises an aggregation of porous, semi-rigid carbon globules.

15. A method for reducing the internal gas pressure of a primary electrochemical cell during the lifetime of the cell comprising the steps of:
providing a primary electrochemical cell including a plurality of electrodes but lacking an electrolytic solution, said electrodes including a plurality of carbon-containing cathodes in which water and an insoluble inert gas are entrapped in the carbon of the carbon-containing cathodes, the carbon of each carbon-containing cathode comprising an aggregation of porous, semi-rigid carbon globules;
evacuating the electrochemical cell; and
purging the cell with a purge gas soluble in the electrolytic solution to be used in the cell and operable to displace water and insoluble gas entrapped in the carbon of the carbon-containing electrodes.

16. A method in accordance with claim 15 wherein:

the step of purging the cell comprises the step of purging the cell with a purge gas soluble in an electrolytic solution including liquid thionyl chloride.

17. A method in accordance with claim 16 wherein: the purge gas is selected from the group consisting of sulfur dioxide and thionyl chloride.

18. A method in accordance with claim 17 further comprising the additional steps of:
evacuating the cell after the purging step; and
introducing into the cell an electrolytic solution in which the purge gas is soluble.

* * * * *